United States Patent [19]
Gregorich

[11] 3,924,172

[45] Dec. 2, 1975

[54] POWER SUPPLY

[75] Inventor: James M. Gregorich, Merrimack, N.H.

[73] Assignee: Honeywell Information Systems, Inc., Waltham, Mass.

[22] Filed: July 11, 1974

[21] Appl. No.: 487,530

[52] U.S. Cl. .................. 321/2; 321/18; 323/DIG. 1
[51] Int. Cl.² ........................................ H02M 3/335
[58] Field of Search ............ 321/2, 8 R, 11, 12, 13, 321/18; 323/17, DIG. 1; 331/111, 112

[56] References Cited
UNITED STATES PATENTS

| | | |
|---|---|---|
| 3,247,422 | 4/1966 | Schultz ........................... 331/112 X |
| 3,432,723 | 3/1969 | Miller et al. ..................... 331/112 X |
| 3,569,818 | 3/1971 | Dahlinger et al. ...................... 321/2 |
| 3,663,949 | 5/1972 | Froeschle ...................... 323/DIG. 1 |
| 3,697,851 | 10/1972 | Mast ....................................... 321/2 |

Primary Examiner—A. D. Pellinen
Attorney, Agent, or Firm—David A. Frank; Ronald T. Reiling

[57] ABSTRACT

A device for converting high level voltage to relatively low level DC voltage for the driving of a plurality of loads. The device utilizes a relatively small transformer with a gapped core and a single transistor to regulate the high frequency power transformer process. Controlled release of magnetic energy induced in the core prevents magnetic saturation of the core.

9 Claims, 2 Drawing Figures

POWER SUPPLY

BACKGROUND OF THE INVENTION

1. Field of the Invention

This invention relates generally to the conversion of power from high to low voltage levels and more particularly to transistorized circuitry for this conversion.

2. Description of the Prior Art

Numerous electronic devices require low level DC voltage to fulfill their power needs. Many of these devices are operated in an environment where the primary and most easily utilized power source is standard AC line voltage, which is approximately 50 to 60 Hz and 95 to 132 volts. Therefore, it is required, when building these devices, to incorporate a component, commonly called the internal power supply, which performs the function of changing the line voltage into the required DC voltage. To achieve this result, AC line power is first rectified and filtered to obtain a high level DC voltage. It is then converted to a lower level voltage by applying in a regulated manner the high level voltage across the primary winding of a power transformer. The secondary winding of the transformer is part of a circuit which filters and averages the voltage induced across the secondary winding, thereby obtaining the desired constant low level DC power to drive a load. A plurality of secondary windings with appropriate circuitry may be utilized to drive more than one load.

Both the primary and secondary windings are wound around a core material. The core can be any material with low magnetic reluctance. Ferrite is one such material. However, if the input voltage is applied to the primary winding at low frequency, a relatively large and heavy core is required. It is generally desirable to minimize both the size and weight of the internal power supply. To achieve this required high frequency regulation of the high level voltage applied across the primary winding, it is common to utilize transistorized circuitry, capable of high-speed switching.

Utilization of high frequency switching circuitry results in a problem: potential volt-second imbalance with respect to application of magnetic energy to the core which threatens magnetic saturation. Upon magnetic saturation of the core, an extremely high current passes through the primary winding and its circuit. In particular, the switching transistor (or transistors) is part of this circuit and will be affected. These transistors will burn out unless high power transistors, which are relatively immune to such current spikes, are used. Such transistors, however, are relatively expensive.

To avoid magnetic saturation, it is necessary to induce or release in the core an opposite and cancelling magnetic flux. This approach is made difficult, however, by the high-frequency power conversion process. To obviate this difficulty, a general practice has been to use two transistors in the switching circuitry, driving the core to its saturation level, first in one direction, and then in the other. However, to successfully implement this approach, the two transistors must be paired within a relatively small spread of critical parameters to assure equal timing cycles, thereby avoiding a saturation of the core. The parameters specified by manufacturers of transistors are within a spread which is too wide for this purpose. Consequently, transistor selection is an expensive and time-consuming process, either for the manufacturer or the user.

There is a power supply with a single transistor switching circuit in the prior art. However, this power supply is neither small and light nor efficient. It requires both a large core and a high power transistor. This is because the magnetic energy is first stored in the core and then, when it is released, used to induce the voltage across the secondary windings for driving loads.

OBJECTS

It is an object of the invention, therefore, to provide an improved power supply which produces a low level DC voltage for driving a plurality of electronic devices.

It is another object of the invention to provide a power supply which is relatively small and light.

It is still another object of the invention to provide a power supply which utilizes in an efficient manner a single transistor to regulate the application of power to a transformer.

It is still another object of the invention to provide a relatively inexpensive transistorized power supply which is subject to high levels of quality control and reliability.

Other objects and advantages of the invention will become apparent from the following description of the preferred embodiment of the invention when read in conjunction with the drawings contained herewith.

SUMMARY OF THE INVENTION

A standard AC line voltage is rectified and filtered to obtain a high level DC voltage. This voltage is then regulated by a high frequency control switch and applied to the primary winding of a power transformer. Secondary windings of the transformer are part of circuits which filter and average the voltage induced across the secondary windings so as to obtain a constant low level DC output voltage for driving a load. The device uses the single transistor as a control switch for regulating the high level DC voltage and requires only a small and relatively light core within the transformer. Control circuitry senses the output voltage and is used to produce a control pulse which is applied to the control switch. Magnetic saturation of the core is prevented by the controlled release of the magnetic energy stored in a gap in the core. A secondary winding of the transformer and a diode comprise a path for the controlled release of this magnetic energy.

DESCRIPTION OF THE PREFERRED EMBODIMENT

Figure 1:
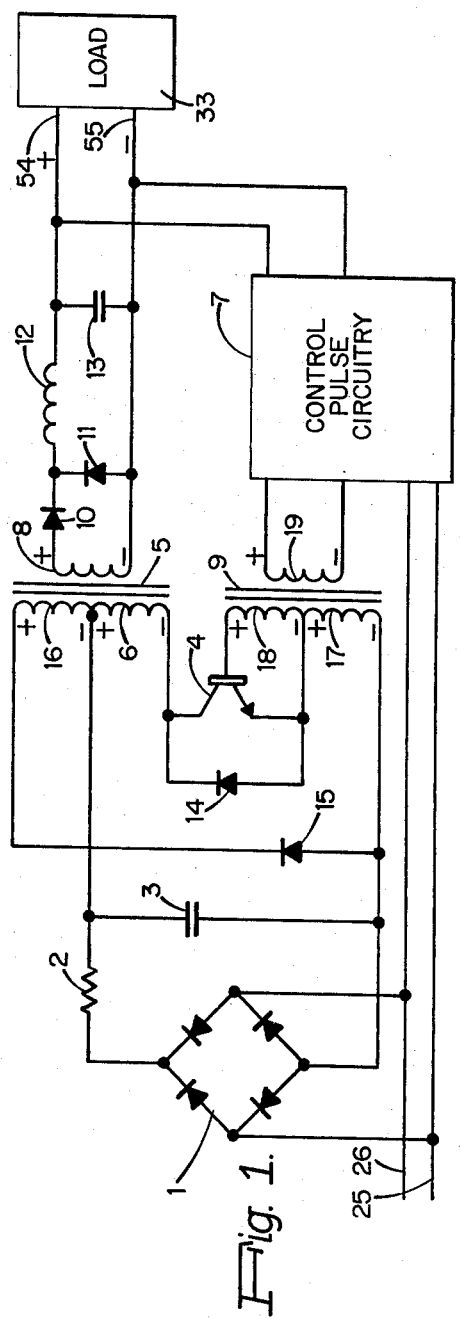
FIG. 1 is a diagram of the power converter circuitry of the power supply.

Referring now to FIG. 1, input wires 25, 26 connect a standard bridge rectifier 1 to a line voltage (typically from 95 to 132 volts and from 50 to 60 Hz). Connected to the positive output terminal of the bridge rectifier 1 is a surge-limiting resistor 2. The resistor is needed because when the line voltage is first attached to the power supply, filtering capacitor 3 tends to draw a high current while charging. The resistor 2 limits the current which can be drawn thereby protecting the diodes in the bridge rectifier 1 and preventing them from burning out. Filtering capacitor 3 is connected to the remaining terminal of the resistor 2 and the negative output terminal of the bridge rectifier 1. The capacitor 3 converts the rectified half-sine wave (120 Hz, DC voltage) to an approximation of a constant DC voltage. The accuracy of this approximation is determined by the capacitor selected. A larger capacitor, namely, one with a higher farad rating, will achieve a better approximation. The rectified and filtered line voltage approximates a constant high-level DC voltage.

So as to require only a small ferrite core 5 for the power transformation process, the voltage must be applied to the primary winding 6 of the transformer under high frequency (approximately 20 KHz in this case). To achieve such high frequency regulation, a transistor 4 (hereafter also called "switch 4") is used as a switching device. The state of the switch 4 is determined by the control pulse circuitry 7. Across the filtering capacitor 3 is attached, in series, the primary winding 6, the switch 4 and the winding 17. The coupling of these components is as follows: from the positive terminal of the capacitor 3 to the positive terminal of the winding 6, from the negative terminal of the winding 6 to the collector of the transistor 4, from the emitter of the transistor 4 to the positive terminal of the winding 17, and from the negative terminal of the winding 17 to the negative terminal of capacitor 3. In addition, there is attached a rectifier 14 across the emitter and the collector of transistor 4. This rectifier 14 is forward biased from the emitter to the collector. The voltages which appear across switch 4 and the winding 17 are small (typically one to two volts) relative to the voltage across the capacitor 3. Accordingly, when the switch 4 is closed, the voltage across the primary winding 6 is approximately the same as the voltage across the capacitor 3.

Due to transformer action, any time a voltage is impressed across the primary winding, proportional voltages will result across the secondary windings. Accordingly, when voltage is impressed across the primary winding 6, a voltage will result across secondary winding 8. The secondary winding 8 is used to drive a load 33. There may be a plurality of secondary windings around the core 5 corresponding to a plurality of loads. Attached to the positive terminal of the secondary winding 8 is an output rectifier 10. A second output rectifier 11 is attached across the remaining terminals of the output rectifier 10 and the secondary winding 8. Both of the output rectifiers 10 and 11 are forward-biased in the direction away from the secondary winding 8. The combining of the two output rectifiers 10 and 11 filters the voltage induced across the secondary winding 8 such that only a DC voltage can appear across it. An inductor 12 is attached to the output terminal of the rectifier 10. Across the remaining terminal of the inductor 12 and the negative terminal of the secondary winding 8 is attached an output capcitor 13. The inductor 12 and the capacitor 13 act to average and filter the DC voltage. A low level constant DC voltage results across the output capacitor 13. Output wires 54, 55 are attached to the terminals of the output capacitor 13 and carry this voltage to drive a load 33.

The control pulse circuitry 7 is attached to the output wires 54, 55 to sense the output voltage. (The control pulse circuitry 7 is also attached to input wires 25, 26.) When the output voltage falls to a certain level with respect to a reference voltage (the average desired output voltage), control pulse circuitry 7 sends a control pulse train indirectly to the switch 4. This control pulse train first causes switch 4 to close. After a predetermined length of time, it then causes the switch 4 to open. When the output voltage once again falls to a certain level with respect to the reference voltage, switch 4 is again closed. It is noted that the "on" period of switch 4 is of a fixed duration whereas the "off" period is variable. In this manner, high frequency regulation of voltage applied across the primary winding 6 is obtained. The control pulse acts upon the switch 4 indirectly by means of a transformer. This transformer has a core 9 and windings, 17, 18, 19. The winding 19 is attached across the output terminals of the control pulse circuitry 7. The winding 18 is attached as follows: from the emitter of the switch 4 to the negative terminal of the winding 18 and from the positive terminal of the winding 18 to the base of the switch 4. (The coupling of the winding 17 has already been described.) The switching of switch 4 results as follows: the control pulse circuitry 7 causes a high voltage spike to be induced through the winding 19. Due to transformer action, a voltage spike is induced through the winding 18 which results in a surge of base current through the transistor 4. This surge of current turns the switch on. In this closed position, current flows from the collector to the emitter of the switch 4 and a voltage results across the primary winding 6. Current also begins to flow through winding 17 which, due to transformer action, induces a current though winding 18 which provides the continuous base current to keep the switch 4 in a closed position. This state continues until acted upon by another control circuitry pulse. When the control circuitry 7 determines that it is time to turn the switch 4 off, it induces a negative voltage across the winding 19. This in turn induces a negative voltage across the winding 18 which causes the switch 4 to open.

The voltage applied across the primary winding 6 is not constant. It alternates due to the opening and closing of the switch 4. When the switch 4 is opened, voltage is not being applied to the primary winding 6 and hence a magnetic field is no longer induced within the core 5. Consequently, the energy stored within the gaps of the core is released and induces a voltage across each of the windings around the core. These voltages have reverse polarity with respect to each of the previous voltages across the windings. Due to the rectifiers 10, 11, 14, current is prevented from flowing in any winding except the secondary winding 16. The winding 16 is attached in series with a rectifier 15 across the capacitor 3. The coupling is as follows: from the positive terminal of capacitor 3 to the negative terminal of winding 16, and rectifier 15 across the negative terminal of capacitor 3 and the positive terminal of winding 16. The rectifier 15 is forward-biased in the direction towards the positive terminal of the winding 16. When the switch 4 is off (i.e. in an open position), the winding 16 is held at the voltage across the capacitor 3. In this manner, the release of magnetic energy from the core of the transformer is clamped to a maximum voltage level which provides safety for the circuit elements. This voltage is of opposite biasing as was induced across the winding 16 when the switch 4 was on. Magnetic saturation of the core 5 will be prevented if this voltage, which is the same voltage that was impressed across the primary winding 6 when the switch 4 was on, is allowed to stay across the winding 16 for a duration equal to that which the voltage was held across winding 6. In other words, if an equal number of volt-seconds are applied in the off-phase as were during the on-phase, the problem of magnetic saturation of core will be negated. The number of turns in the windings 6 and 16 must be nearly equal so as to avoid an overburdening of the switch 4 during the off-phase.

Figure 2:
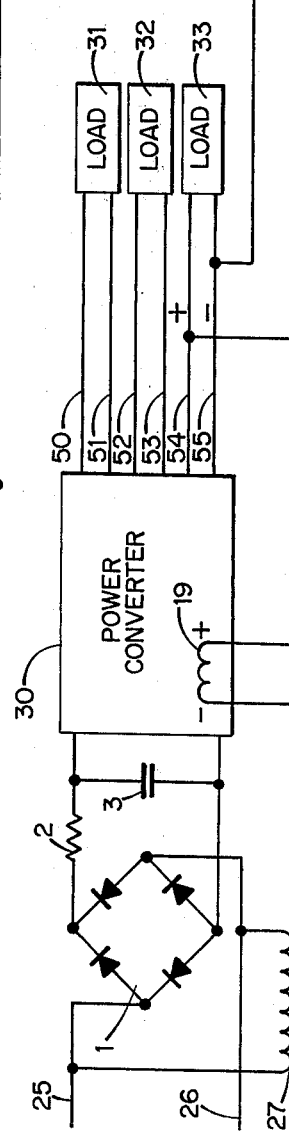
FIG. 2 is a diagram of the control pulse circuitry of the power supply.
Figure 2:
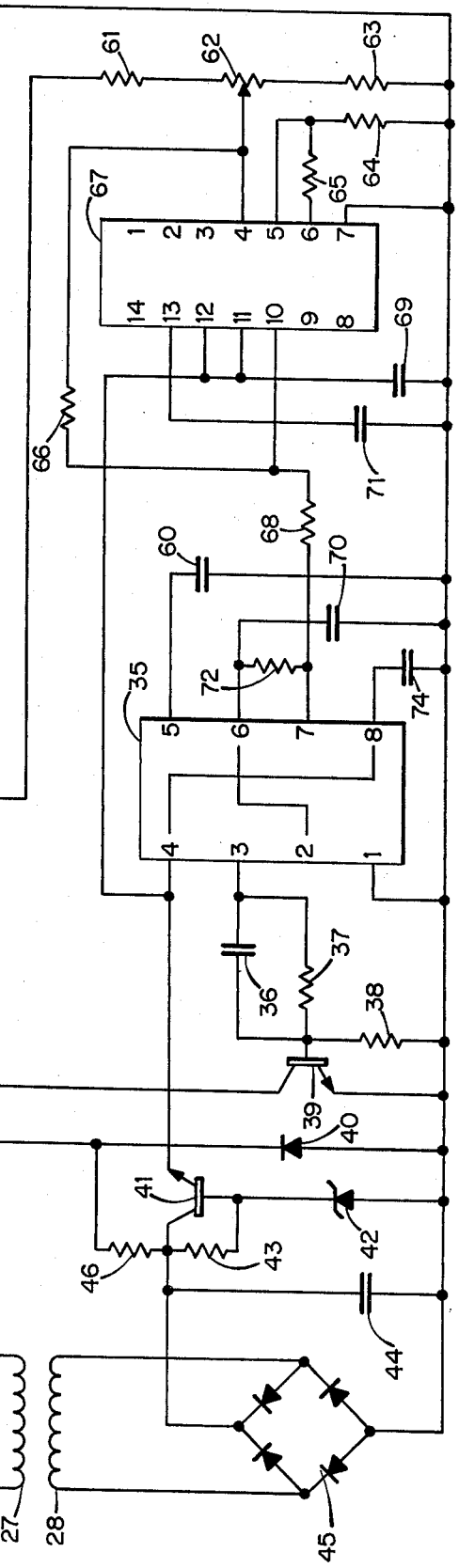

To generate the desired control pulse, the control pulse circuitry 7 of FIG. 1 is shown in detail in FIG. 2. The power converter circuitry described in FIG. 1 is represented as the power converter 30 in FIG. 2.

Referring now to FIG. 2, the power converter 30 is capable of driving a plurality of loads 31, 32, 33 with its low level DC output (5 volts, 35 amps). Consequently, there are shown pairs of output wires 50 and 51, 52 and 53, 54 and 55 leading to the loads 31, 32, 33 respectively. One pair of output leads, 54, 55, is used by the control pulse circuitry to sense the output voltage. The lead 55 which is negative with respect to the other lead 54 is used as an output ground. Across the lead 54 and the output ground 55 is attached, in series, a resistor 61, a potentiometer 62 (1K Ohm), and another resistor 63. The slider of the potentiometer 62 is attached to pin 4 of an error amplifier 67. The error amplifier 67 is a standard integrated circuit, a MU 723 voltage regulator. Connected to pin 5 of the error amplifier 67 and to the output ground 55 is a resistor 64. A resistor 65 is attached from pin 5 to pin 6 of the error amplifier 67, and pin 7 is attached to the output ground 55. The error amplifier 67 uses the voltage at pin 6 as a reference voltage. It compares the voltages at pin 4 and pin 5 and amplifies the difference between these voltages as the output at pin 10. Pins 11 and 12 of the error amplifier 27 are attached to one terminal of a capacitor 69, and the other terminal of the capacitor 69 is attached to the output ground 55. The capacitor 69 acts as a noise filter. A resistor 66 is attached from pin 4 to pin 10 of the error amplifier 67. A capacitor 71, for frequency compensation, is attached from pin 13 of error amplifier 67 to the output ground 55.

A resistor 68 is attached to pin 10 of error amplifier 67 and to pin 7 of a timer 35. The timer 35 is a standard integrated circuit NE 555. The capacitors 60 and 70 are attached from pins 5 and 6 respectively of timer 35 to the output ground 55. A resistor 72 is attached from pin 6 to pin 7 of the timer 35. Across pin 8 of the timer 35 and the ground 55 is attached a capacitor 74.

Also on the timer 35, pin 2 is shorted to pin 6 and pin 4 is shorted to pin 8. Pin 1 is attached to output ground 55, and pin 4 is attached to pin 12 of the error amplifier 67. From pin 3 of timer 35 to the base of transistor 39 is attached, in parallel, a resistor 37 and capacitor 36. A resistor 38 is attached to the base of the transistor 39 and to the output ground 55. The emitter of transistor 39 is attached to the output ground 55. The collector of transistor 39 is attached to the positive terminal of winding 19. Across the output ground 55 and the negative terminal of the winding 19 is attached a rectifier 40 biased in a direction towards the winding 19. Transistor 39 acts as a switch. The position of the switch depends on the state of the timer 35.

Pin 6 of the timer 35 and the capacitor 70 are charged by the output of pin 10 of the error amplifier through the resistors 68, 72. When the resulting voltage on pin 6 is equal to the voltage on pin 5, the timer 35 changes state and pin 3 drops to a low voltage. This in turn causes the transistor 39 to turn off. At the same time, the capacitor 70 begins to discharge. When it has decayed to a given level, the timer 35 changes state again and pin 3 turns high. This in turn causes the transistor 39 to turn on.

When the transistor 39 is on, current flows through and voltage is applied to the winding 19. When the transistor 39 is turned off, the voltage reverses itself giving rise to a voltage spike. This is the pulse which causes the switch 4 in the power converter 30 to turn on. When the capacitor 70 has decayed to a given level, the timer 35 changes state and causes the transistor 39 to turn on. Once again, voltage is applied to the winding 19. This pulse also appears in the winding 18 of the power converter 30 and causes the switch 4 to turn off.

To achieve relatively noise-free power conversion, it is desirable to isolate the control pulse circuitry 7 from the power conversion circuitry 30. Consequently, the input leads 25, 26 to the power supply are also attached to the winding 27 of an isolating transformer. Winding 28 of the isolating transformer is attached to a standard bridge rectifier 45. Across the output terminals of the bridge rectifier 45 is attached a capacitor 44. The negative output terminal of the bridge rectifier 45 is also attached to the output ground 55. The positive output terminal of the bridge rectifier 45 is also attached to the collector of a transistor 41. The emitter of the transistor 41 is attached to pin 4 of the timer 35. The collector of the transistor 41 is also attached to the negative terminal of winding 19 through a resistor 46. A 12 volt Zener diode 42 is attached to the base of the transistor 41 and the output ground 55, forward biased in the direction towards the base of the transistor 41. A resistor 43 is attached across the base and the collector of the transistor 41. Transistor 41 acts as a regulator for controlling the application of power to the timer 35 and the error amplifier 67.

Typical values for the components used in these circuits are as follows:

TABLE OF TYPICAL VALUE OF COMPONENTS

| CAPACITOR | MICROFARADS |
|---|---|
| 3 | 2500 |
| 13 | 6500 |
| 69 | 1 |
| 71 | 100 picofarads |
| 60 | .01 |
| 70 | .01 |
| 74 | 1.8 |
| 36 | .15 |
| 44 | 120 |

| RECTIFIER | No. |
|---|---|
| 10 | IN 3909 |
| 11 | IN 3909 |
| 14 | IN 4936 |
| 15 | IN 4936 |
| 40 | IN 4933 |

| RESISTOR | OHMS |
|---|---|
| 2 | .25 |
| 61 | 1.5K |
| 63 | 1.5K |
| 64 | 2.7K |
| 65 | 4.7K |
| 66 | 500K |
| 68 | 1K |
| 72 | 1.5K |
| 37 | 510 |
| 38 | 2K |
| 43 | 620 |
| 46 | 620 |

| INDUCTOR | MICROHENERY |
|---|---|
| 12 | 35 |

| TRANSISTOR | No. |
|---|---|
| 4 | 2N 6308 |
| 39 | D44C7 |
| 41 | D44C7 |

What is claimed is:

1. A circuit for converting high level DC voltage to low level DC voltage for driving a plurality of attached loads, said circuit comprising in combination:
   first means for transforming a voltage comprising:
      a core having a gap therein,
      a primary winding around said core, and
      a plurality of ordered secondary windings around said core;
   second means including a diode in series with the first of said plurality of ordered secondary windings, said second means connected across said high level DC voltage forming a controlled path for the release of magnetic energy in said core, whereby said second means prevents magnetic saturation of said core;
   a plurality of filtering and averaging circuit means coupling each of the remainder of said plurality of said ordered secondary windings to one of said loads respectively;
   control circuit means coupled to at least one of said plurality of filtering and averaging circuit means for providing a control signal responsive to the voltage level of said one filtering and averaging circuit means; and
   switching means responsive to said control signal serially connecting said primary winding to said high level DC voltage.

2. A circuit as recited in claim 1 wherein said core is of a ferrite material.

3. A circuit as recited in claim 1 wherein said switching means includes a transistor and wherein when said transistor acts as a closed switch said plurality of filtering and averaging circuit means receive energy through said remainder of the plurality of secondary windings and when said transistor acts as an open switch said second means prevent magnetic saturation.

4. A circuit as recited in claim 1 wherein said switching means is indirectly coupled to said control circuit means by a second transformer, said control circuit means providing said control signal to a primary winding of said second transformer, said switching means coupled to a secondary winding of said second transformer.

5. A circuit for converting voltage for driving a plurality of attached loads, said circuit comprising in combination:
   first means for transforming voltage, said first means having two phases of operation, a first phase comprising simultaneously storing magnetic energy while directly driving said loads and a second phase comprising releasing said stored magnetic energy while indirectly driving said loads; and
   second means connected in series to a primary winding of said first means for establishing the sequential, timed application of voltage to said first means, said timed application providing a period for the release of said stored magnetic energy; and
   third means including a diode connected in series with a secondary winding of said first means providing a controlled path for the release of said stored magnetic energy.

6. A circuit as recited in claim 5 wherein said first means includes a core of ferrite material.

7. A circuit as recited in claim 5 wherein said first means includes a core with a gap therein.

8. A circuit as recited in claim 5 further including fourth means for providing a signal responsive to an output voltage from said second means for varying the timing of said second means.

9. A circuit as recited in claim 8 wherein said second means includes a transistor for controlling the application of voltage to said first means, said transistor responsive to said signal.

* * * * *